A. JACKSON.
INDICATOR PADLOCK.
No. 10,440.
Reissued Jan. 29, 1884.
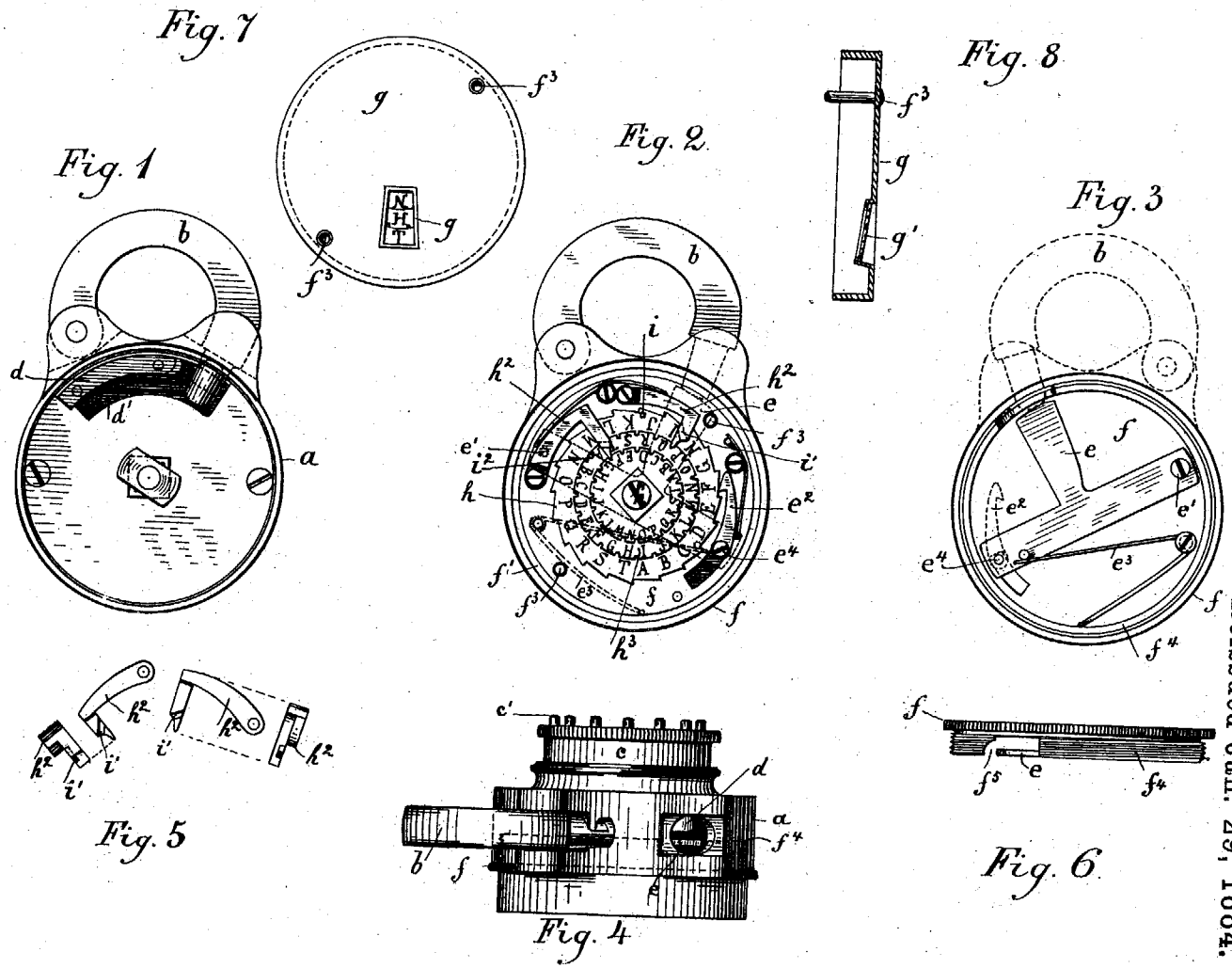
Witnesses:
J. Lorum.
J. Oliver Morris.
Inventor
Andrew Jackson
By Pruner & Fisher
His Attorneys.
N. PETERS, Photo-Lithographer, Washington, D. C.

UNITED STATES PATENT OFFICE.

ANDREW JACKSON, OF SAN FRANCISCO, CALIFORNIA, ASSIGNOR OF TWO-THIRDS TO ALBERT B. PULLMAN AND MORRIS E. WARD, BOTH OF CHICAGO, ILLINOIS.

INDICATOR-PADLOCK.

SPECIFICATION forming part of Reissued Letters Patent No. 10,440, dated January 29, 1884.

Original No. 287,028, dated October 23, 1883. Application for reissue filed January 4, 1884.

*To all whom it may concern:*

Be it known that I, ANDREW JACKSON, a citizen of the United States, residing at San Francisco, county of San Francisco, State of California, have invented certain new and useful Improvements in Indicator-Padlocks; and I do hereby declare the following to be a full, clear, and exact description of the invention, sufficient to enable others skilled in the art to make and use the same.

The invention consists, first, in combining with the ordinary padlock mechanism indicator mechanism distinct therefrom but detachably connected thereto, and provided with means whereby the indicator mechanism may be operated by the shackle of the lock; and, secondly, it consists in providing the indicator mechanism with means whereby it may be operated by the free end of the lock-shackle.

The invention also consists of sundry other details of construction to be hereinafter fully described, and particularly pointed out in the claims. By this means the organization of the lock proper remains intact and wholly distinct from the indicator mechanism, so that this latter may be readily adapted as an attachment to many of the usual forms of padlock without in the least modifying or disturbing the internal structure thereof.

In the accompanying drawings, which show the improvements applied to a combination, lock, Figure 1 is a view in rear elevation, the back plate of the padlock upon which the indicator mechanism is mounted being removed; Fig. 2, a similar view with the back plate and attached indicator mechanism in position. Fig. 3 is a view of the reverse side of the back plate from Fig. 2; Fig. 4, a top plan view of the completed padlock; Fig. 5, a view of the reverse side of the retaining-pawls, and Fig. 6 a detached view of the back plate; Figs. 7 and 8, detail views of the cap or cover to the indicator mechanism.

Within the shell or casing *a*, having the usual shackle-bar, *b*, pivoted thereto, is arranged any of the ordinary forms of lock mechanism, whether operated through intervention of a key or otherwise. In the present form, chosen for illustration, the shackle is dogged by a bolt, *d*, secured to a rotatable plate, *d'*, which is turned from without the casing *a* by the cylinder *c*, secured to said plate. A series of set-pins, *c'*, serve to position the tumblers inclosed by cylinder *c*, so that bolt *d* may be thrown according to the particular combinations to which said tumblers are set. Around the inner rim of casing *a*, at its rear side, a screw-thread is cut, with which engages the threaded rim $f^4$, projecting circumferentially from near the outer edge of the back plate, *f*. By means of said threaded rim the back plate, *f*, may be firmly secured to or easily detached from casing *a*, there being a cut-away portion, as at $f^5$, to said rim, which, when plate *f* is in position, comes opposite to the opening in casing *a*, through which the shackle *b* passes. If the shackle be closed down and dogged by the lock-bolt *d*, it is plain that as shackle *b* rests within the cut-away $f^5$ it serves as a stop or guard to prevent rim $f^4$ from being unscrewed, so that no clandestine removal of back plate, *f*, or tampering with the indicator mechanism mounted thereon can occur while the lock is closed. The end of shackle-bar *b*, when down, impinges upon the arm of a lever, *e*, pivoted at *e'* to back plate, *f*. A bent spring, $e^3$, secured to plate *f* rests at one end upon the inner side of the rim or flange $f^4$, and at its opposite end bears against a stud on lever *e*, thereby forcing said lever upward and in position beneath the cut-away $f^5$ to receive the thrust or impact of the shackle-bar *b* when it is brought down to be dogged. Turning on a common arbor, *h'*, on the outer side of plate *f* is a series of indicator-wheels of different radius, having letters, figures, or like symbols on their marginal faces, and notched or detent edges. The inner wheels of the series have spring-retaining pawls $h^2$, which engage the notched rims of said wheels and prevent the same from turning save at intervals, as hereinafter described. The outer or larger wheel of the series has its detent edge in contact with a spring-pawl, $e^2$, pivoted, as at $e^4$, to a pin projecting from lever *e* through an elongated slot in plate *f*. With each downward thrust of the shackle-bar *b* in position to be secured by the lock-bolt, the lever $e$ is turned about its pivot, so that pawl $e^2$ advances the outer numbering-wheel the space of one detent. At the end of one complete revolution of said wheel the projecting pin $i$ passes into engagement with the inclined slot or kerf $i'$, cut in the under faces of retaining-pawl $h^2$, lifting the pawl from out its notch and allowing the outer and the next smaller wheel, $h^3$, to move together by simple frictional contact. The pin clears the kerf in the throw of one detent, so that pawl $h^2$ drops into the next notch of the series and holds the wheel $h^3$ immovable pending another complete revolution of the next outer wheel of the set. A like pin, $i^2$, on the wheel $h^3$ performs the same function as just described in conjunction with the retaining-pawl $h^2$ of the next smaller wheel; from all of which it is plain that in a set of three wheels, mounted as described, and having, for example, twenty-six characters around the margin of each wheel, there will be $26 \times 26 \times 26$ changes before the same combination of symbols will recur. A cover, $g$, resting in a circular recess, $f'$, of the plate $f$, and securely fastened thereto, as at $f^3$, protects the indicator mechanism from tampering, and through a slot, $g'$, in the said cover allows the combination to which the indicator-wheels are set when the lock is closed to be noted for future reference. It is manifest that this compact arrangement of the indicator-wheels in superposed series brings it within easy compass for attachment to any of the usual forms of padlock, and at the same time so multiplies the combinations of symbols, which must pass before a second recurrence, as to make an unauthorized opening of the lock without detection practically impossible. The number of indicator-wheels and of the symbols thereon may be varied, as desired. It will be remembered that casing $g$ is effectually fastened to back plate, $f$, so that no access to the indicator can be had, although the plate $f$ is unscrewed from casing $a$. There may be a click, as usual, to prevent turning of outer wheel, $h$, save in one way.

Not limiting myself to the precise details hereinbefore set forth, and having thus described the invention, what I claim as new, and desire to secure by Letters Patent, is—

1. In an indicator-padlock, the combination, with the ordinary lock mechanism, of the indicator mechanism distinct therefrom, but detachably connected to the casing of the lock, and means, substantially as described, for operating the indicator mechanism, projecting within the path of the lock-shackle, whereby movement is imparted to the indicator mechanism from the lock-shackle, substantially as set forth.

2. In an indicator-padlock, the combination, with the lock-shackle, of the indicator mechanism, having means, substantially as described, for operating the same, lying in the path of the end of the lock-shackle, and arranged to be operated thereby to move the indicator mechanism, substantially as set forth.

3. In an indicator-padlock, the lock-casing having mounted thereon indicator mechanism provided on its outer side with a series of wheels, and upon its inner side with a lever for operating said wheels, located in the path of the shackle, and so arranged with relation thereto that the action of closing the shackle will move the indicator mechanism, substantially as described.

4. In a padlock, an indicator mechanism consisting of a series of superposed wheels having detent edges and suitable designating-characters on the faces thereof, in combination with mechanism, substantially as set forth, for operating the wheels of the series each time the lock is closed, substantially as described.

5. The combination, with the shackle-bar $b$, of the indicator mechanism having the spring-lever $e$, the pawl $e^2$, and the indicator-wheel, substantially as described.

In testimony whereof witness my hand this 31st day of March, 1883.

ANDREW JACKSON.

Witnesses:

JAMES H. PEIRCE,

GEO. P. FISHER, Jr.